(12) United States Patent
Berkus et al.

(10) Patent No.: US 8,938,104 B2
(45) Date of Patent: Jan. 20, 2015

(54) SYSTEMS AND METHODS FOR ADAPTIVE FILTERING

(75) Inventors: Timo Berkus, Ennetbaden (CH); Patrik Kunz, Baden (CH); Markus Oelhafen, Rohr (CH); Marc Kachelrieβ, Nurnberg (DE)

(73) Assignee: Varian Medical Systems International AG (CH)

( * ) Notice: Subject to any disclaimer, the term of this patent is extended or adjusted under 35 U.S.C. 154(b) by 1417 days.

(21) Appl. No.: 12/201,390

(22) Filed: Aug. 29, 2008

(65) Prior Publication Data

US 2010/0054562 A1    Mar. 4, 2010

(51) Int. Cl.
G06K 9/00    (2006.01)
G06T 11/00    (2006.01)
G06T 5/00    (2006.01)

(52) U.S. Cl.
CPC .............. *G06T 11/005* (2013.01); *G06T 5/002* (2013.01); *G06T 2207/10081* (2013.01); *G06T 2207/20012* (2013.01); *G06T 2207/20221* (2013.01)
USPC ............ 382/131; 382/128; 382/260; 382/274

(58) Field of Classification Search
USPC ................. 382/128, 131, 254, 261, 264, 274
See application file for complete search history.

(56) References Cited

U.S. PATENT DOCUMENTS

| | | | | |
|---|---|---|---|---|
| 4,205,375 A | * | 5/1980 | Inouye et al. | 378/4 |
| 4,549,265 A | * | 10/1985 | Deckers et al. | 378/14 |
| 4,580,219 A | * | 4/1986 | Pelc et al. | 382/131 |
| 4,682,289 A | * | 7/1987 | Nishihara | 378/14 |
| 4,789,929 A | * | 12/1988 | Nishimura et al. | 378/15 |
| 5,168,375 A | * | 12/1992 | Reisch et al. | 382/250 |
| 5,204,627 A | * | 4/1993 | Mistretta et al. | 324/309 |
| 5,368,033 A | * | 11/1994 | Moshfeghi | 600/419 |
| 5,414,622 A | * | 5/1995 | Walters | 382/131 |
| 5,485,494 A | * | 1/1996 | Williams et al. | 378/16 |

(Continued)

FOREIGN PATENT DOCUMENTS

| | | |
|---|---|---|
| EP | 1 172 069 A1 | 1/2002 |
| EP | 1 244 058 A1 | 9/2002 |

OTHER PUBLICATIONS

Yao Wang, "EE3414 Multimedia Communication Systems-I Image Filtering: Noise Removal, Sharpening, Deblurring", 2006, Polytechnic University, p. 1-41.*

(Continued)

*Primary Examiner* — Gandhi Thirugnanam
(74) *Attorney, Agent, or Firm* — Vista IP Law Group, LLP

(57) ABSTRACT

A system for obtaining an image includes a processor for receiving a projection image, processing the projection image to obtain a filtered image, applying a first factor for the projection image to obtain a first weighted image, applying a second factor for the filtered image to obtain a second weighted image, and obtaining a corrected image using the first and second weighted images, and a medium for storing the corrected image. A method of processing an image includes receiving a projection image, processing the projection image to obtain a filtered image, and determining a corrected image by applying a first factor for the projection image and applying a second factor for the filtered image. A method for obtaining an image includes determining a factor, using the factor to control a radiation source, and using the factor to reduce noise in an image generated using the radiation source.

33 Claims, 8 Drawing Sheets

(56) References Cited

U.S. PATENT DOCUMENTS

| | | | | |
|---|---|---|---|---|
| 5,491,735 A * | 2/1996 | Hsieh | | 378/15 |
| 5,559,847 A * | 9/1996 | Hu et al. | | 378/4 |
| 5,606,585 A * | 2/1997 | Hu | | 378/15 |
| 5,668,845 A * | 9/1997 | Migita | | 378/4 |
| 5,802,134 A * | 9/1998 | Larson et al. | | 378/4 |
| 5,818,896 A * | 10/1998 | Hsieh | | 378/15 |
| 5,822,393 A * | 10/1998 | Popescu | | 378/108 |
| 5,848,114 A * | 12/1998 | Kawai et al. | | 378/4 |
| 5,867,555 A * | 2/1999 | Popescu et al. | | 378/16 |
| 5,881,122 A * | 3/1999 | Crawford et al. | | 378/4 |
| 5,887,047 A * | 3/1999 | Bailey et al. | | 378/4 |
| 5,920,319 A * | 7/1999 | Vining et al. | | 345/420 |
| 5,933,471 A * | 8/1999 | Kalvin | | 378/4 |
| 6,016,333 A * | 1/2000 | Kalvin | | 378/4 |
| 6,091,840 A * | 7/2000 | Hu et al. | | 382/131 |
| 6,215,841 B1 * | 4/2001 | Hsieh | | 378/8 |
| 6,343,160 B1 * | 1/2002 | Giannetti et al. | | 382/305 |
| 6,452,996 B1 * | 9/2002 | Hsieh | | 378/15 |
| 6,542,570 B1 * | 4/2003 | Silver | | 378/4 |
| 6,570,951 B1 * | 5/2003 | Hsieh | | 378/4 |
| 6,678,346 B2 * | 1/2004 | Hsieh | | 378/4 |
| 6,744,846 B2 * | 6/2004 | Popescu et al. | | 378/16 |
| 6,842,502 B2 * | 1/2005 | Jaffray et al. | | 378/65 |
| 6,888,919 B2 * | 5/2005 | Graf | | 378/65 |
| 6,990,231 B2 * | 1/2006 | Goto | | 382/154 |
| 7,031,425 B2 * | 4/2006 | Hsieh et al. | | 378/5 |
| 7,113,203 B1 * | 9/2006 | Wu et al. | | 348/207.99 |
| 7,336,758 B2 * | 2/2008 | Seto et al. | | 378/4 |
| 7,623,615 B2 * | 11/2009 | Kawachi et al. | | 378/4 |
| 7,649,981 B2 * | 1/2010 | Seppi et al. | | 378/158 |
| 8,260,403 B2 * | 9/2012 | Fukutani et al. | | 600/476 |
| 8,270,561 B2 * | 9/2012 | Zamyatin et al. | | 378/8 |
| 2003/0002090 A1 * | 1/2003 | Clifton | | 358/475 |
| 2004/0165766 A1 * | 8/2004 | Goto | | 382/154 |
| 2005/0201605 A1 * | 9/2005 | Li et al. | | 382/131 |
| 2006/0120505 A1 * | 6/2006 | Seto et al. | | 378/4 |
| 2006/0262895 A1 * | 11/2006 | Kawachi et al. | | 378/4 |
| 2006/0285761 A1 * | 12/2006 | Kasperkiewicz et al. | | 382/254 |
| 2008/0273778 A1 * | 11/2008 | Goto et al. | | 382/131 |
| 2009/0046833 A1 * | 2/2009 | Hirokawa et al. | | 378/108 |
| 2010/0054562 A1 * | 3/2010 | Berkus et al. | | 382/131 |
| 2012/0070049 A1 * | 3/2012 | Iwase et al. | | 382/128 |
| 2012/0275561 A1 * | 11/2012 | Li et al. | | 378/19 |
| 2013/0163714 A9 * | 6/2013 | Li et al. | | 378/19 |

OTHER PUBLICATIONS

Gonzalez and Woods, Digital image processing, 2nd edition, Prentice Hall, 2002. Chap 1-3, pp. 1-146.*

Marc Kachelrieβ et al., "Generalized multi-dimensional adaptive filtering for conventional and spiral single-slice, multi-slice, and cone-beam CT", Medical Physics, Apr. 2001, pp. 475-490, vol. 28, Issue 4, Institute of Medical Physics, University of Erlangen-Nurnberg, Germany.

English Abstract for EP 1 172 069.

English Abstract for EP 1 244 058.

Lifeng Yu, PhD et al., "Image Wisely—Image Reconstruction Techniques", American College of Radiology, 2010, 3 pages.

CT Reconstruction, 2 pages.

* cited by examiner

SYSTEMS AND METHODS FOR ADAPTIVE FILTERING

FIELD

This invention relates generally to systems and methods for performing a radiation procedure, and more specifically, to systems and methods for obtaining images using a radiation machine.

BACKGROUND

Computed tomography is an imaging technique that has been widely used in the medical field. In a procedure for computed tomography, an x-ray source and a detector apparatus are positioned on opposite sides of a portion of a patient under examination. The x-ray source generates and directs an x-ray beam towards the patient, while the detector apparatus measures the x-ray intensity at a plurality of transmission paths defined by the x-ray beam during the process. The detector apparatus produces a voltage proportional to the intensity of incident x-rays, and the voltage is read and digitized for subsequent processing in a computer. Based on this intensity map, the attenuation is calculated for each transmission path. By taking a large number of readings from multiple angles around the patient, relatively massive amounts of data are thus accumulated. The accumulated data are then analyzed and processed for reconstruction of a matrix (visual or otherwise), which constitutes a depiction of a density function of the bodily section being examined. By considering one or more of such sections, a skilled diagnostician can often diagnose various bodily ailments such as tumors, blood clots, etc.

When processing projection images for reconstruction of a volumetric image, image filtering may be applied for removal of noise. In existing techniques, a pre-scan gantry range (e.g. 180°) is needed to obtain parameters (e.g., fixed information) for determining a suitable filtering model. The projection images are then obtained, and the filtering model is applied to the projection images in a retrospective image reconstruction process. Such technique results in a lengthy time needed to get projection images and a considerable reconstruction delay. Techniques that use a-priori fixed filtering parameters are less flexible and may lead to inaccuracy in filtering because the resulting filter is applied to all situations the same way. Also, due to the fixed nature of the filtering model, the technique is not the most efficient.

SUMMARY

In accordance with some embodiments, a system for obtaining an image includes a processor for receiving an image and processing the image to obtain a corrected image using an adaptive filtering technique. In some embodiments, the parameter(s) for the adaptive filtering is obtained by analyzing projection images, and determining the best possible adaptive filtering parameter(s) based on such analysis.

In accordance with some embodiments, a system for obtaining an image includes a processor for receiving a projection image, processing the projection image to obtain a filtered image, applying a first factor for the projection image to obtain a first weighted image, applying a second factor for the filtered image to obtain a second weighted image, and obtaining a corrected image using the first and second weighted images, and a medium for storing the corrected image.

In accordance with other embodiments, a method of processing an image includes receiving a projection image, processing the projection image to obtain a filtered image, and determining a corrected image by applying a first factor for the projection image and applying a second factor for the filtered image.

In accordance with other embodiments, a method for obtaining an image includes determining a factor, using the factor to control a radiation source, and using the factor to reduce noise in an image generated using the radiation source.

In accordance with other embodiments, a system for obtaining an image includes a radiation source, and a processor configured to determine a factor, control the radiation source using the factor, and reduce noise in an image generated using the radiation source based on the factor.

Other and further aspects and features will be evident from reading the following detailed description of the embodiments, which are intended to illustrate, not limit, the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
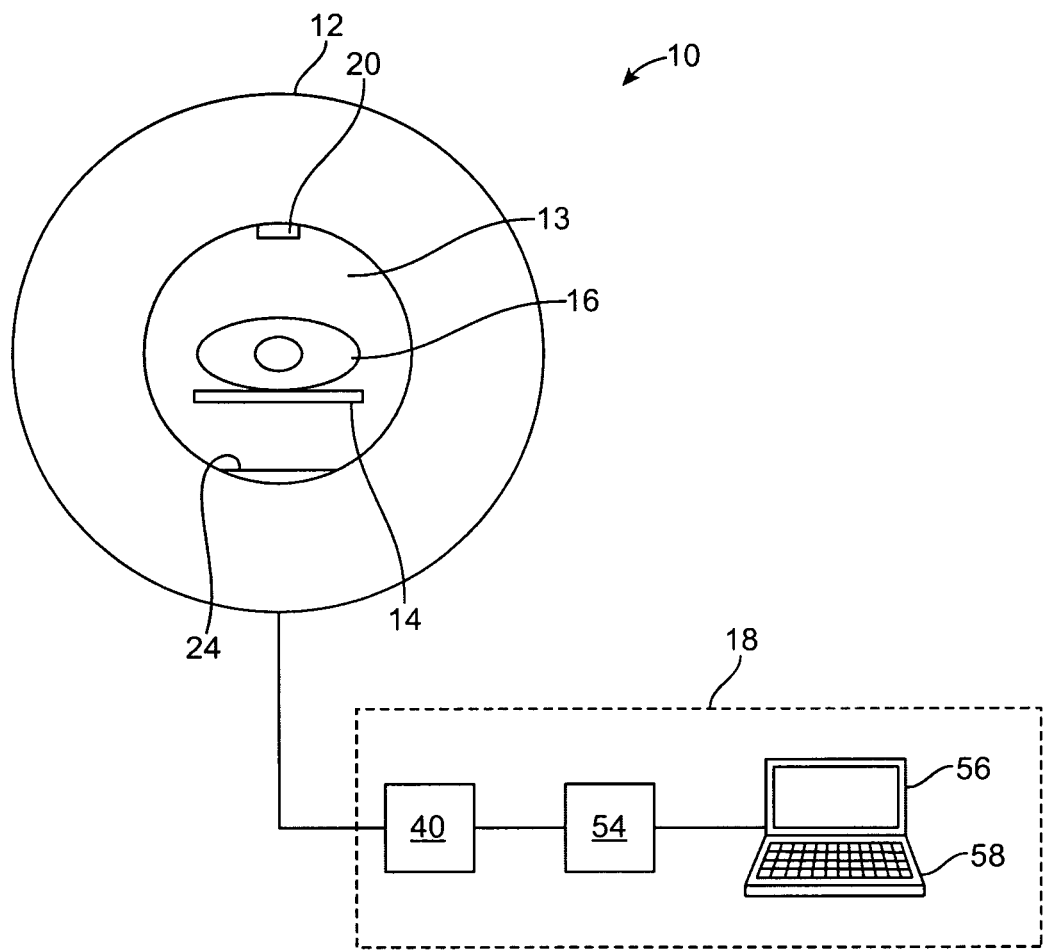
FIG. 1 is a block diagram of a radiation system having a processor for processing projection images in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

Referring now to the drawings, in which similar or corresponding parts are identified with the same reference numeral, FIG. 1 illustrates a computed tomography image acquisition system 10, in which embodiments of the present invention can be employed. The system 10 includes a gantry 12 having an opening (or bore) 13, a patient support 14 for supporting a patient 16, and a control system 18 for controlling an operation of the gantry 12. The system 10 also includes a radiation source 20 (e.g., an x-ray source) that projects a beam of radiation (e.g., x-rays) towards a detector 24 on an opposite side of the gantry 12 while the patient 16 is positioned at least partially between the radiation source 20 and the detector 24. In the illustrated embodiments, the radiation source 20 is configured to provide a cone beam. However, in other embodiments, the radiation source 20 may be configured to provide other types of beams, such as a fan beam, or a pencil beam. The detector 24 has a plurality of sensor elements configured for sensing a radiation that passes through the patient 16. Each sensor element generates an electrical signal representative of an intensity of the radiation beam as it passes through the patient 16.

In the illustrated embodiments, the radiation source 20 is a diagnostic radiation source for providing diagnostic energy. In other embodiments, instead of, or in addition to, being a diagnostic radiation source, the radiation source 20 can also be a treatment radiation source for providing treatment energy. In some embodiments, the treatment energy is generally those energies of 160 kilo-electron-Volts (keV) or greater, and more typically 1 Mega-electron-Volts (MeV) or greater, and diagnostic energy is generally those energies below the high energy range, and more typically below 160 keV. In other embodiments, the treatment energy, and the diagnostic energy can have other energy levels, and refer to energies that are used for treatment and diagnostic purposes, respectively. In some embodiments, the radiation source 20 is able to generate X-ray radiation at a plurality of photon energy levels within a range anywhere between approximately 10 keV and approximately 20 MeV. Radiation sources capable of generating X-ray radiation at different energy levels are described in U.S. patent application Ser. No. 10/033,327, entitled "RADIOTHERAPY APPARATUS EQUIPPED WITH AN ARTICULABLE GANTRY FOR. POSITIONING AN IMAGING UNIT," filed on Nov. 2, 2001, and U.S. patent application Ser. No. 10/687,573, entitled "MULTI-ENERGY X-RAY SOURCE," filed on Oct. 15, 2003. In the illustrated embodiments, the radiation source 20 is located within the bore 13. Alternatively, the radiation source 20 may be located at an arm that is coupled to the gantry 12.

In the illustrated embodiment, the control system 18 includes a processor 54, such as a computer processor, coupled to a gantry rotation control 40. The control system 18 may also include a monitor 56 for displaying data and an input device 58, such as a keyboard or a mouse, for inputting data. During a scan to acquire x-ray projection data, the gantry 12 rotates about the patient 16. The rotation of the gantry 12 and the operation of the x-ray source 20 are controlled by the gantry rotation control 40, which provides power and timing signals to the x-ray source 20 and controls a rotational speed and position of the gantry 12 based on signals received from the processor 54. Although the control 40 is shown as a separate component from the gantry 12 and the processor 54, in alternative embodiments, the control 40 can be a part of the gantry 12 or the processor 54.

During a procedure, the radiation source 20 generates and directs a radiation beam towards the patient 16, while the detector 24 measures the radiation intensity at a plurality of transmission paths defined by the radiation beam during the process. The detector 24 produces a voltage proportional to the intensity of incident radiation, and the voltage is read and digitized for subsequent processing in a computer, such as the processor 54 or another processor. After image data at different gantry angles have been collected, the collected data are processed for reconstruction of a volume (CT image), which constitutes a depiction of a density function of the bodily section being examined. In some embodiments, the reconstructed CT image may be a three-dimensional image. By considering one or more of such sections, a skilled diagnostician can often diagnose various bodily ailments. In some cases, the one or more sections can also be used to perform treatment planning, and/or to verify a position of a target tissue.

Figure 2:
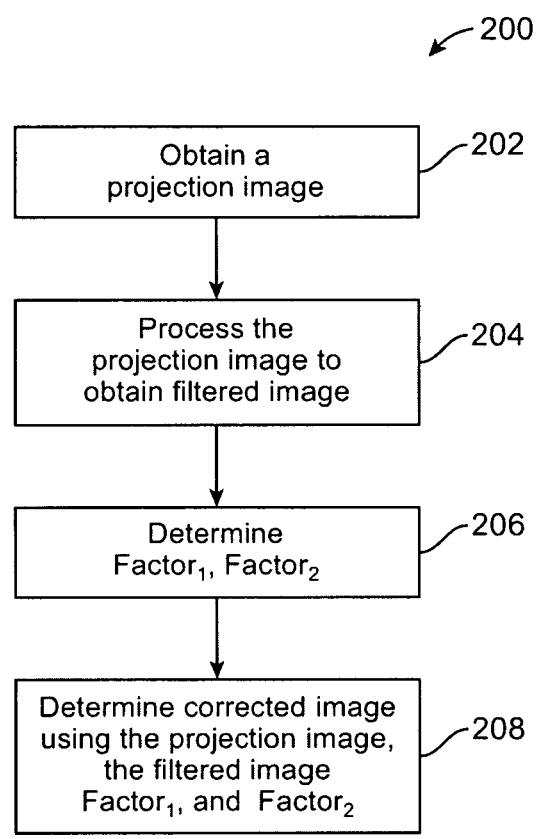
FIG. 2 is a block diagram illustrating an operation of the processor of FIG. 1 in accordance with some embodiments.

FIG. 2 illustrates a method 200 for processing images using the system 10 in accordance with some embodiments. First, a projection image is obtained (Step 202). In the illustrated embodiments, the projection image may be created by activating the source 20 to provide a radiation beam. The radiation exiting the patient 16 is received by the detector 24, which generates image signals in response to the detected radiation. The image signals are read from the detector 24, and are transmitted to the processor 54, or another processor, which obtains the projection image. As used in this application, the term "projection image" should not be limited to the example described, nor should it be limited to an image that is generated using a specific device or method, and may be used to refer to an image that is obtained using any technique that is known in the art of imaging.

Next, portion(s) or a subset of the original projection image is processed to obtain a filtered image (Step 204). In the illustrated embodiments, the filtered image is obtained by replacing or correcting pixels based on a result of an operation performed on pixel values of neighboring pixels in a manner that reduces noise. Various techniques may be employed for filtering an image. For example, a bilinear running mean algorithm may be used in some embodiments. Other techniques known in the art may also be used in other embodiments. The act of processing the image to obtain the filtered image may be performed by the processor 54, or another processor, which is programmed to perform the function.

Various techniques may be used to determine which portion(s) of the projection image is to be filtered. In some embodiments, depending on the previously acquired projections, one can decide whether a portion of the image has a high attenuation compared to the surrounding tissue. If the portion of the image has a significantly higher attenuation compared to the surrounding tissue, then it is more probable to be quantum noise. In such cases, the portion of the image with high probability of quantum noise is then filtered. Methods of determining which portion(s) of the original projection image is to be filtered will be described in further detail below.

Next, factors $Factor_1$, $Factor_2$ are determined (Step 206), and a corrected projection image is determined using the original projection image obtained from step 202, a filtered image obtained from step 204, and the factors obtained from step 206 (Step 208). In general $Factor_1$ and $Factor_2$ are functions, e.g., weighting functions. In some embodiments, $Factor_1$ may be related to $Factor_2$. For example, in some embodiments, $Factor_1$ and $Factor_2$ may be related by the equation: $1=\Sigma Factor_i$. In such cases, if $Factor_2=W$, then $Factor_1=1-Factor_2$. In the illustrated embodiments, the corrected projection image may generally be determined by the equation: $P_{corr}(x,y)=Factor_1(x,y)*P_{raw}(x,y)+Factor_2(x,y)*P_{filtered}(x,y)$, in which $P_{corr}$ is a matrix that represents the corrected projection image data, $P_{raw}$ is a matrix that represents the original projection image data, and $P_{filtered}$ is a matrix that represents a filtered image and may be equal to $Kernel(x,y)*P_{raw}(x,y)$ in some embodiments. Thus, the corrected projection image is a two dimensional composite image determined using the original image and the filtered image— e.g., applying Factor$_1$ to the original image and applying Factor$_2$ to the filtered image. In other embodiments, by using higher orders of the above parameters, one can improve the quality of the adaptive filtering. In such cases, the higher order parameter(s) may have their respective factor(s). It should be noted that the corrected image determined in Step 208 may be considered a filtered image. As used in this specification, the term "filtered image" refers to an image that is obtained using a filtering technique. In some embodiments, the Factor$_1$ may be 1, and the original image may be unaltered in the above equation. In such cases, the act of applying the Factor$_1$ may be performed by merely using the original image itself (e.g., as a factored image in the above equation). Similarly, in some embodiments, the Factor$_2$ may be 1, and the filtered image may be unaltered in the above equation. In such cases, the act of applying the Factor$_2$ may be performed by merely using the filtered image itself (e.g., as a factored image in the above equation). Thus, as used in this specification, the phrase "applying a factor" (to an image), or similar phrases, should not be limited to the act of multiplying an image by a factor, and may refer to the act of determining, using, or accepting an image itself as a factored image without an affirmative act of multiplying the image by a factor. In addition, as used in this specification, the term "factored image" or similar terms (such as "weighted image") should not be limited to an image that has been factored or weighted (e.g., by multiplying it by a factor), and may refer to an image itself without any alteration, wherein the image itself may be considered a factored image (corresponding to a factor=1) or a weighted image (corresponding to an image weighted by a factor=1). Furthermore, as used in this specification, the term "weighted image" may refer to a "factored image" (e.g., an image for which a factor has been applied), and thus, the terms "weighted image" and "factored image" may be used interchangeably.

It should be noted that the steps described in the method 200 need not be performed in the order illustrated, and that the steps may be performed in other orders in other embodiments. For example, in other embodiments, the act of determining the factors Factor$_1$ Factor$_2$ (step 206) may be performed before, or simultaneous with, the act of obtaining the filtered image (step 204).

Figure 3:
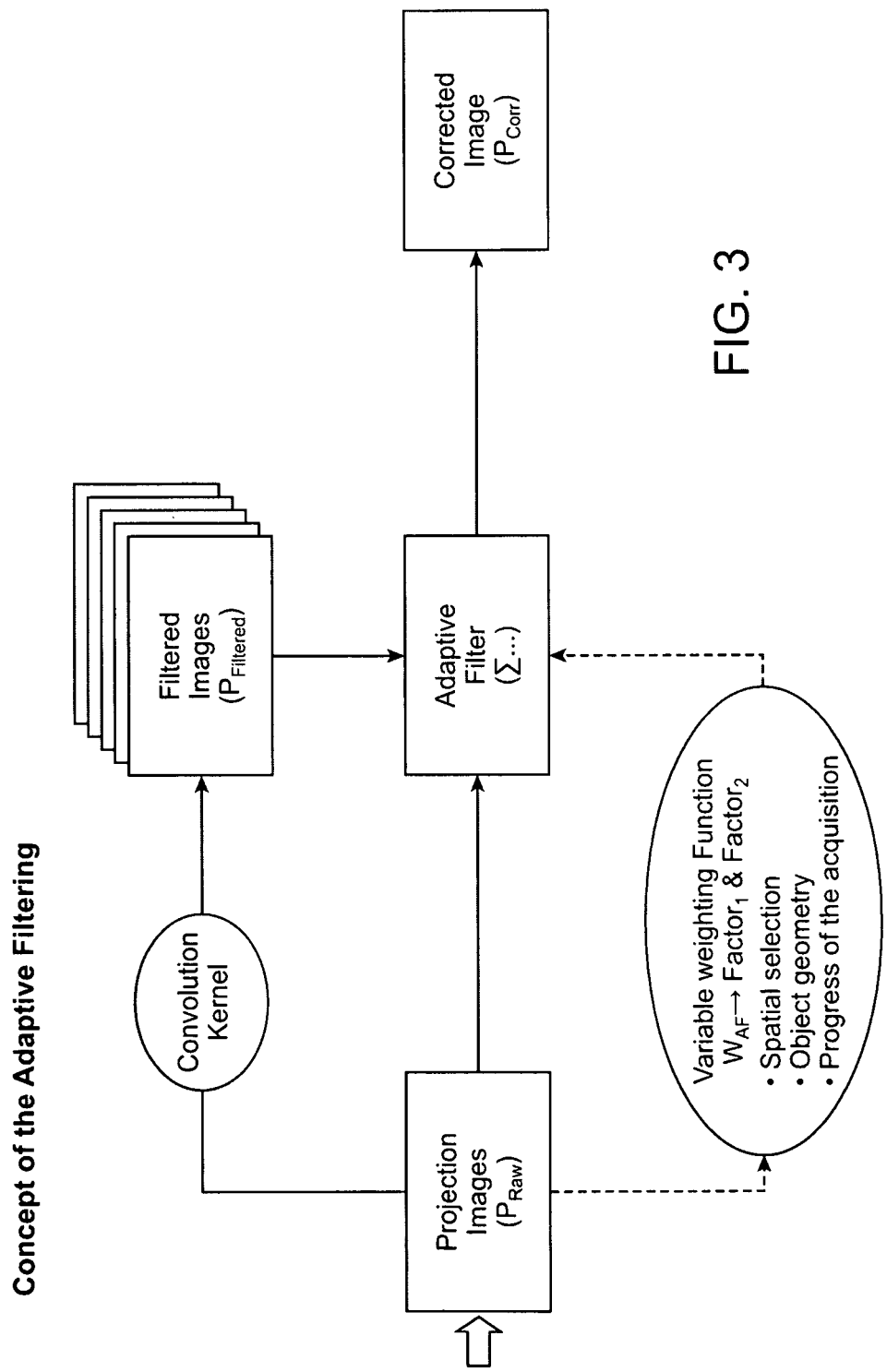
FIG. 3 is a block diagram illustrating a concept of adaptive filtering in accordance with some embodiments.

FIG. 3 is a block diagram illustrating the above-described concept in accordance with some embodiments. In the illustrated embodiments, the factor Factor$_2$ represents how much of the filtered image is used relative to the original projection image. For example, if Factor$_2$ is equal to 1, then all of the filtered image, and no original projection image, is used to determine the corrected image. On the other hand, if Factor$_2$ is equal to 0, then all of the original projection image, and no filtered image, is used to determine the corrected image. By varying the value of Factor$_2$ between 0 and 1, the system 10 can determine different corrected image regions in an image using different combination of weighted raw image data and weighted filtered image data. The act of determining the factors Factor$_1$ Factor$_2$, and the act of determining the corrected image may be performed by the processor 54, or another processor, which is programmed to perform the function.

In the illustrated embodiments, the system 10 uses a learning process to determine which portion(s) of the original projection image to apply filtering. This learning process takes advantage of the fact that projection images obtained at different gantry angles have different maximal attenuation values. In particular, the system 10 determines which portion(s) of the original projection image to apply filtering by considering the number of projection images (e.g., total number or a subset of the total number) that have been obtained. Depending on the gantry position of the radiation source 20, the maximal attenuation values q may be different for projection images obtained at different gantry angles.

Figure 4A:
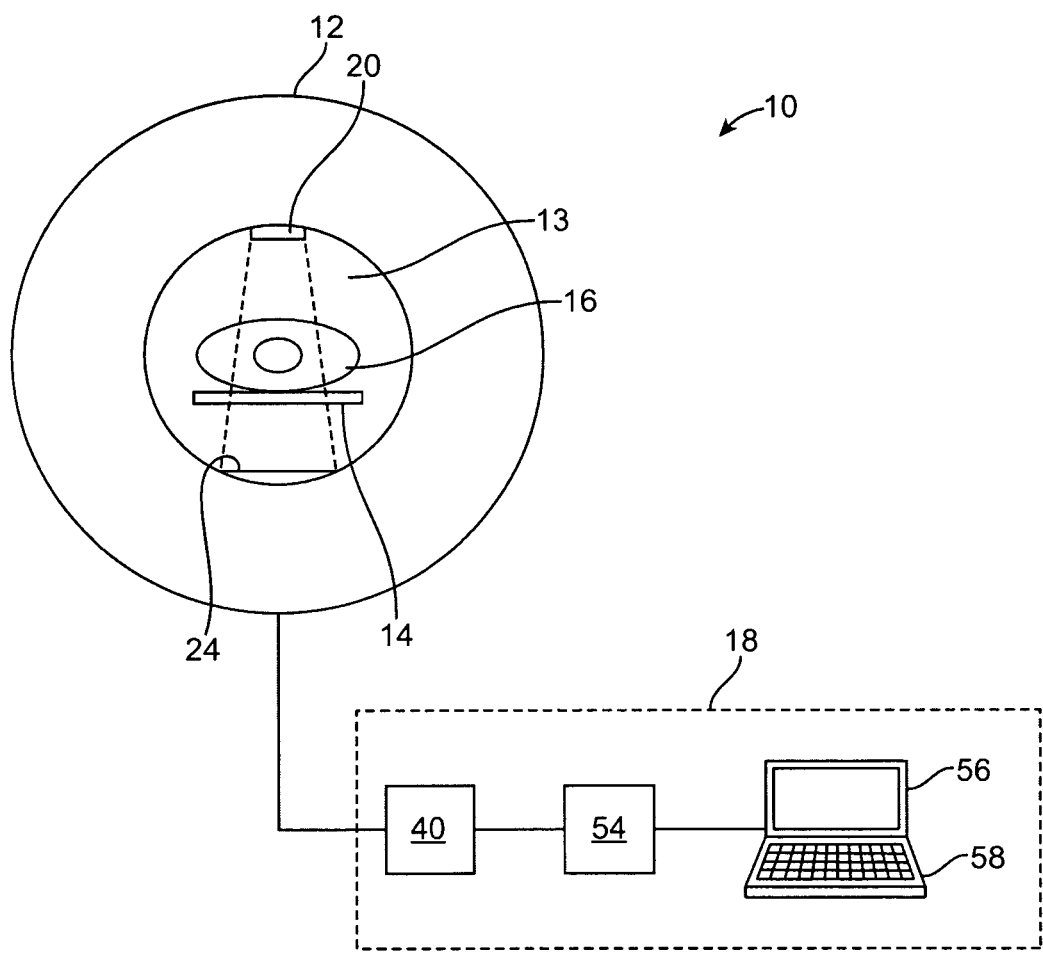
FIGS. 4A and 4B illustrate an operation of the radiation system of FIG. 1 in accordance with some embodiments.
Figure 4B:
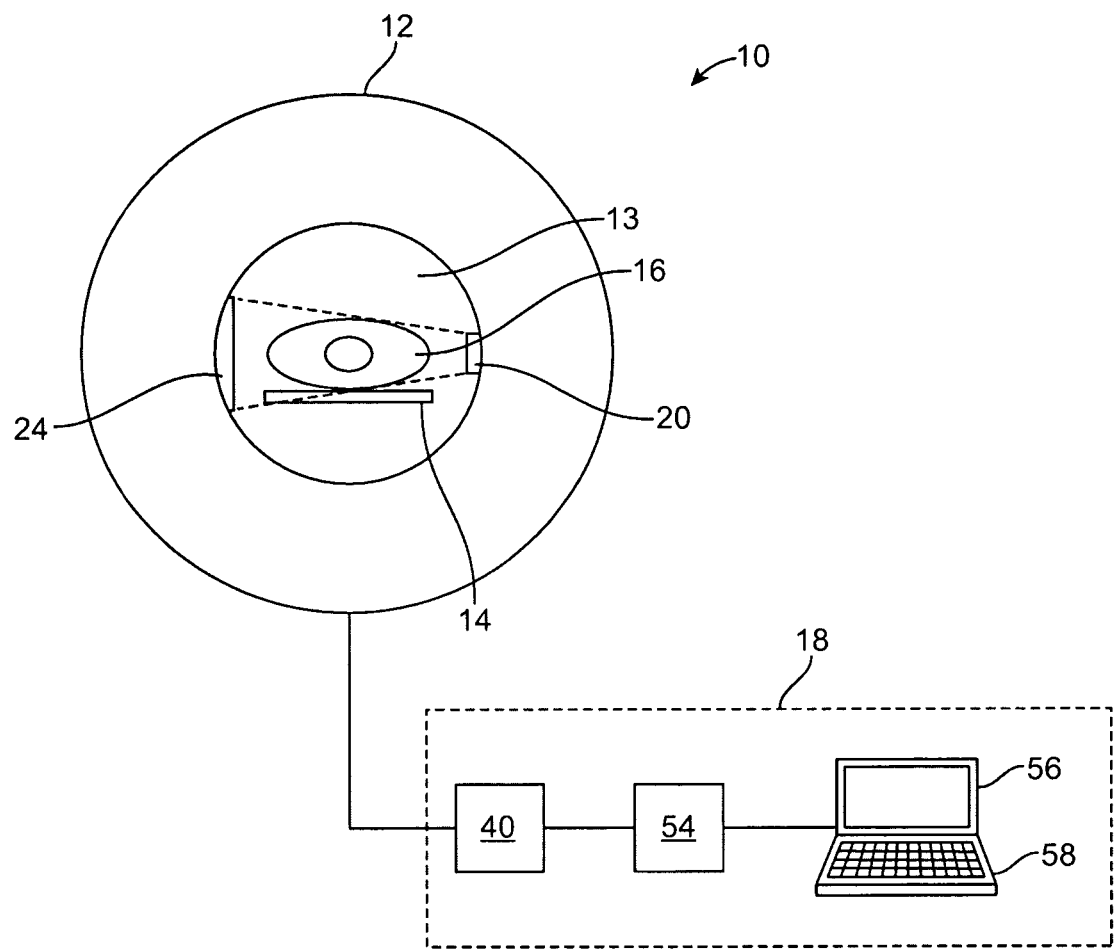

This concept is illustrated in FIGS. 4A and 4B. When the radiation beam is applied towards the object at an angle that is perpendicular to the width of the object (FIG. 4A), the radiation beam will go through the object in a front-to-back direction. This results in an image having a certain quantum noise. The image that is generated will have a certain maximal attenuation value q (e.g., for a particular pixel). On the other hand, when the radiation source is rotated to a different gantry angle such that the radiation beam is applied towards the object at an angle that is parallel to the width of the object (FIG. 4B), the radiation beam will go through the object in a lateral direction. Because the beam goes through more tissue (which attenuates the beam more) at this gantry angle, the quantum noise will be higher than that previously. In this case, the image will have a maximal attenuation value q that is different from that discussed with reference to FIG. 4A. The difference in the maximal attenuation values is due to the object geometry and composition of the material in the object that is being imaged.

Figure 5:
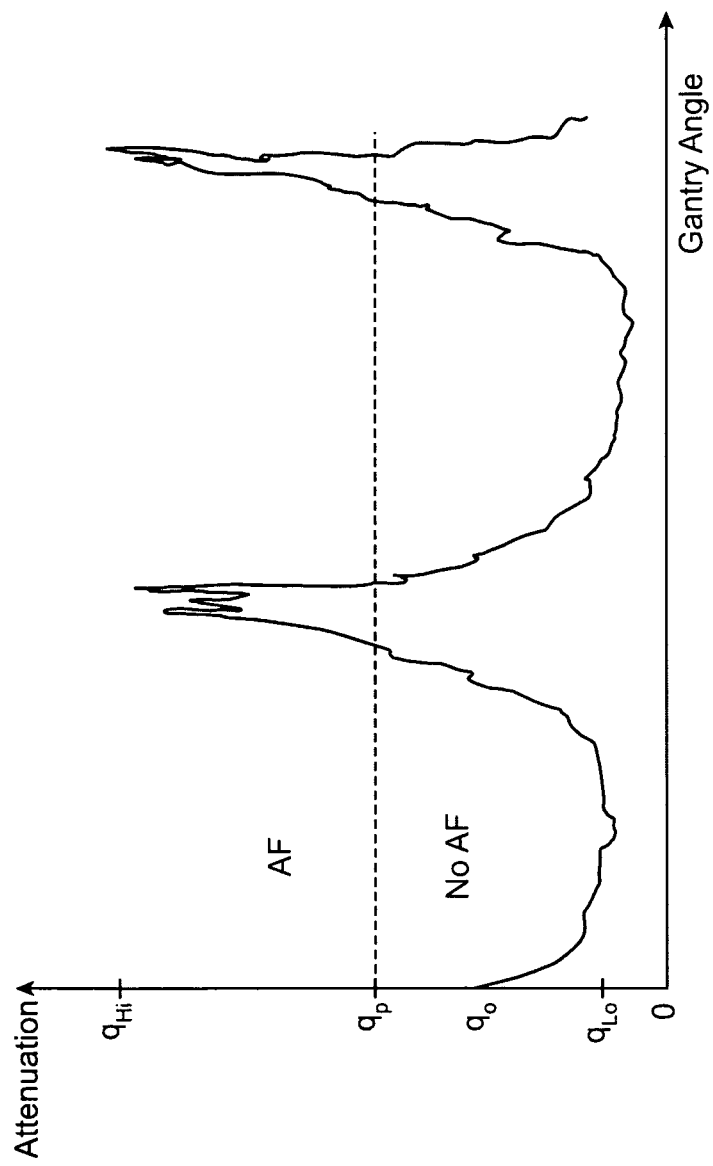
FIG. 5 is a graph illustrating an example of how an attenuation value varies with gantry angle.

FIG. 5 is a diagram illustrating how the relative maximal attenuation value q of each projection varies as a function of the gantry angle A. In the illustrated embodiments, as the gantry 12 rotates to generate projection images at different angles, the system 10 determines the maximal attenuation values q for the respective images, and keeps track of them. As shown in FIG. 5, after the gantry 12 has gone through a certain range of rotation, the minimum $q=q_{LO}$, and the maximum $q=q_{HI}$ can be determined. In the illustrated embodiments, based on the values of $q_{LO}$ and $q_{HI}$, a prescribed $q_p$ may be determined. For example, $q_p$ may be determined by taking the average of $q_{LO}$ and $q_{HI}$. Alternatively, $q_p$ may be equal to $q_{LO}$ plus a percentage of ($q_{HI}-q_{LO}$). Other criteria for selecting $q_p$ may be utilized in other embodiments. Thus, as the system 10 generates more projection images, the value $q_p$ is adjusted based on information obtained from the projection images that are generated. Eventually, when $q_{LO}$ and $q_{HI}$ are obtained, the value $q_p$ will become stable.

The prescribed $q_p$ is used to prescribe a threshold, above which, the adaptive filtering is to be applied, and below which, no adaptive filtering is to be applied. In some embodiments, once $q_p$ is determined, this the threshold value that is used for filtering all projection images at different angles. In such embodiments, the system applies filtering to all pixels in each of the subsequent projection images with attenuation values that are above $q_p$. In some cases, the system may also go back to the previously generated projection images and apply filtering for those images as well. The above technique for selecting portion(s) of the image for filtering is used to account for the difference in noise that exists at different regions in the image. Note that as noise is directly related to dose, the ration of noise in contrast to the object geometry varies. Therefore, the noise ratio is also an indicator for the object geometry. So for region(s) within an image having noise that is below a threshold, no filtering is applied, and for the region(s) having noise above a threshold, filtering is applied. Because projection images at different gantry angles may have regions with different attenuation values, the regions in each of the projection images that require filtering may be different for each of the projection images. Thus, as illustrated, the selection of the portion(s) of the original projection image for filtering is a function of the number of projection images that have been obtained, the maximal attenuation value q for each of the images, and the attenuation values of each of the projection images.

Once the portion(s) of the projection image that is desired to be corrected has been determined, the system 10 then determines the corrected image portion according to the equation $P_{corr}(x,y)=Factor_1(x,y)*P_{raw}(x,y)+Factor_2(x,y)*P_{filtered}(x,y)$, as described previously. In the above embodiments, $P_{raw}$ represents the portion(s) of the original image to which correction is applied. In other embodiments, $P_{raw}$ may represent the entire frame of original image. In such cases, $Factor_2$ is a matrix that contains information regarding the position of the portion(s) (e.g., pixel(s)) that requires filtering. For example, for the pixels in the original projection image that do not require correction, the values in the $Factor_2$ matrix that correspond with these pixels will be "0." It should be noted that in the illustrated embodiments, the non-zero values in the matrix $Factor_2$ may have different values for different pixels (e.g., based on the actual attenuation values of the pixels). Also, the non-zero values may vary from image to image. For example, in some embodiments, image with higher maximal attenuation value may have higher filtering factor. In some embodiments, a reference geometry value may be used to help the system 10 determine $Factor_1$ and/or $Factor_2$. The object geometry value is used to account for the difference in attenuation effects at different gantry angles due to the geometry (e.g., shape, size, density distribution, etc.) of the object that is being imaged. In some embodiments, the reference geometry may be represented by a ratio between the lengths of the major and minor axes of an ellipsoid (or a cross sectional shape of an object that resembles an ellipse). In such cases, the reference geometry value may be a value that is between 1.0 and 3.0, and more preferably, between 2.0 and 2.8, such as 2.5. In some cases, using the value 2.5 as the initial reference geometry value may be desirable because it allows the noise artifact to be more dominant, thereby allowing the adaptive filtering to be performed more efficiently. In other embodiments, the reference geometry value may be higher than 2.5, and may be infinite. This reference geometry value represents a ratio of the object's attenuation effect in a lateral direction (e.g. from left shoulder to right shoulder) to the object's attenuation effect in a front-to-back direction. In other embodiments, the reference geometry value may represent other aspects associated with the object geometry. For example, the reference geometry value may correlate with a relationship between the object geometry and a generalized patient's geometry. During the method 200, the actual geometry value for the object that is being imaged is determined. The actual geometry value is then compared with the reference geometry value. The system 10 then adjusts the factor $Factor_1$ and/or $Factor_2$ based on a result of the comparison. For example, if the actual geometry value is less than the reference geometry value, then the value of $Factor_2$ is decreased to use less filtered image data, and more original raw image data (or $Factor_1$ may be increased). On the other hand, if the actual geometry value is more than the reference geometry value, then the value of $Factor_2$ is increased to use more filtered image data, and less original raw image data (or $Factor_1$ may be decreased). In the embodiments in which $Factor_2$ is a matrix, the adjustment of $Factor_2$ would involve adjusting only the non-zero values in the matrix.

The amount of adjustment for the factor $Factor_1$ and/or $Factor_2$ may be based on any prescribed criteria. For example, in some embodiments, the value of $Factor_2$ may be decreased by 10% (or other percentages) if the actual geometry value is less than the reference geometry value. In other embodiments, the amount of adjustment is based on a result of the comparison between the actual geometry value and the reference geometry value, and is therefore, a function of these parameters. For example, the amount of adjustment for $Factor_2$ may be higher if the difference between the actual geometry value and the reference geometry value is higher. Other criteria may also be used to determine the amount of adjustment in other embodiments.

In some embodiments, $Factor_1$ and/or $Factor_2$ may also depend on a desired range of image scan (e.g., angular rotation sequence around the object desired to be scanned). For example, in some cases, if the desired range is 180°, then $Factor_2$ may be adjusted higher (or $Factor_1$ may be adjusted lower), which allows the system 10 to compensate for image noise more aggressively. On the other hand, if the desired range is 360°, then $Factor_2$ may be adjusted lower (or $Factor_1$ may be adjusted higher).

It should be noted that the method 200 may be repeated to obtain additional projection images at different gantry angles. For example, the radiation source 20 may be rotated to different angles to obtain different projection images, and the above method 200 may be performed to obtain corrected images for different gantry angles. The range of positions at which the radiation source 20 can be placed varies. In some embodiments, the gantry 12 makes a 360° rotation around the patient 16 during an image data acquisition. Alternatively, if a full fan detector (i.e., a detector that is centered on the opposite side of the radiation source, as opposed to a detector that is offset) is used, the system 300 may acquire data while the gantry 12 rotates 180° plus the fan angle. Other angles of rotation may also be used, depending on the particular system being employed.

The embodiments of the adaptive filtering technique described above are advantageous because for a given maximum allowable dose to the patient, it allows optimization of image quality without the need to acquire prior knowledge of the measured attenuations within the scan range. In some embodiments, the steps 204-208 of the method 200 can be performed during an imaging process, such as a scan process, to obtain a set of images. For example, the steps 204-208 may be performed online while the gantry 12 rotates about the patient 16, such as during a calibration session, a diagnostic session, a treatment planning session, or during a treatment session. The above technique is also advantageous because by providing on-the-fly adjustment to the adaptive filter parameters, corrected images may be obtained quickly and accurately during an image scan. In some cases, the above adaptive filtering technique may be used to decrease a radiation dose to the patient while preserving the signal-to-noise ratio (SNR), as will be described below. Furthermore, the above technique is specifically more advantageous for Cone-Beam Computed Tomography (CBCT) because CBCT covers a larger z-range, thereby providing a whole projection from which a selection may be made as to where in the image frame to perform filtering.

In some embodiments, the corrected image may be stored in a medium for later use. For example, the stored corrected projection image may be used in an image reconstruction process to create a three-dimensional CT image. Because the projection images have been corrected for noise using the above described techniques, the resulting CT image will also have less noise. In some embodiments, the corrected projection image, or the CT image created using the corrected image, may be used to determine a treatment plan for the patient 16, verify a treatment plan, determine a position of a target region within the patient 16, track a position of a target region, and/or gate an operation of a treatment device. For example, in some cases, the corrected image, or the CT image created using the corrected image, may be processed by the processor 54 (or another processor) to generate control signal(s) for activating or de-activating a radiation treatment source (e.g., source 20), rotating the gantry 12, controlling a collimator for adjusting a radiation beam, and/or positioning the support 16.

In the above embodiments, for a given radiation dose for the patient, the system 10 reduces the noise in projection images. In other embodiments, the radiation tube current may be reduced to thereby reduce an amount of radiation dose to the patient. This has the effect of increasing noise in the projection images generated by the system 10. However, in such cases, the above noise-reduction technique may be applied to reduce the noise in the projection images. In some cases, the above noise-reduction technique may be used to offset the amount of noise increase attributable to does reduction. In other cases, the above noise-reduction technique provides a noise reduction that more than offsets the amount of noise increase attributable to dose reduction. Thus, the above adaptive filtering technique for noise reduction can reduce noise in images and/or provide optimal imaging dose for a patient.

Figure 6:
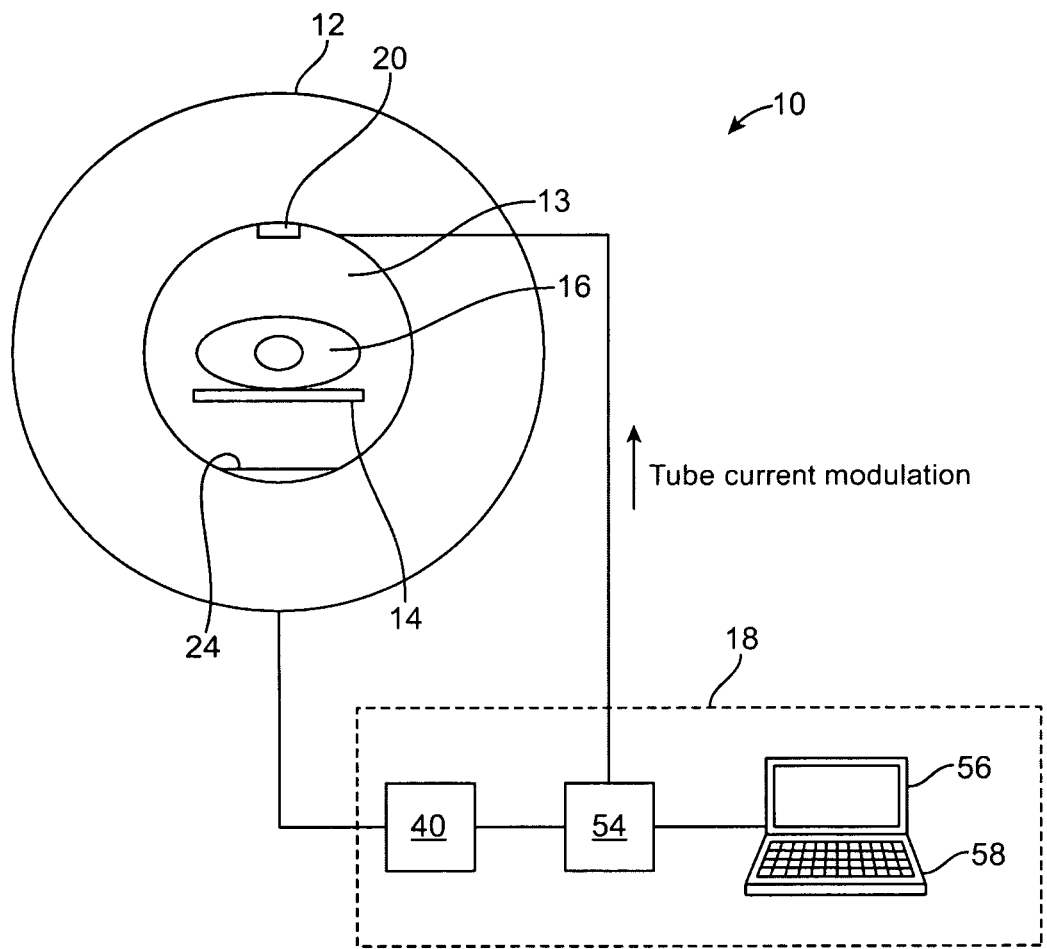
FIG. 6 is a block diagram of a radiation system having a feedback feature in accordance with some embodiments.

FIG. 6 illustrates a method of reducing dose to a patient 16 in accordance with some embodiments. As shown in the figure, the system 10 includes a feedback loop from the processor 54 for controlling the radiation source 20. In the illustrated embodiments, the system 10 determines how much noise is reduced based on the filtering techniques described herein, such as that described with reference to FIG. 2, and modulates the tube current based on the noise reduction. For example, the system may determine how much to reduce the tube current based on a condition that dose approximately correlates with $1/\text{Noise}^2$. In some cases, the $q_p$ and factors $\text{Factor}_1$, $\text{Factor}_2$, and/or other parameter(s) related to noise reduction, may be used as feedback to control the radiation source 20, e.g., to modulate a tube current. In some embodiments, using the above tube current modulation technique, at least approximately 50% of the dose can be reduced, while keeping the same original noise amount. It should be noted that a complete pre-scan is not required in order to obtain parameters to control tube current. This is because the system will determine $q_p$, $\text{Factor}_1$, $\text{Factor}_2$, and/or other parameter(s) relating to noise reduction, during the above described learning process during a sub-prescan-phase, thereby training itself during that phase to determine how much tube current to modulate. In other embodiments, instead of using the image correction methods (e.g., that described with reference to FIG. 2) described herein for reducing noise, the system 10 can modulate the tube current based on noise reduction determined using other image correction methods. Also, in further embodiments, the system does not use the above correlation between dose and noise. Instead, the system varies the amount of tube current reduction as a function of gantry angle.

It should be noted that the embodiments of the above image filtering techniques can be used with other types of imaging, such as spiral CT, laminar tomography, PET, SPECT, PET-CT, or the like, to reduce radiation dose to a patient and/or to enhance an image quality of a target region. As such, the application of the filtering technique described herein should not be limited to the imaging devices described herein.

Computer System Architecture

Figure 7:
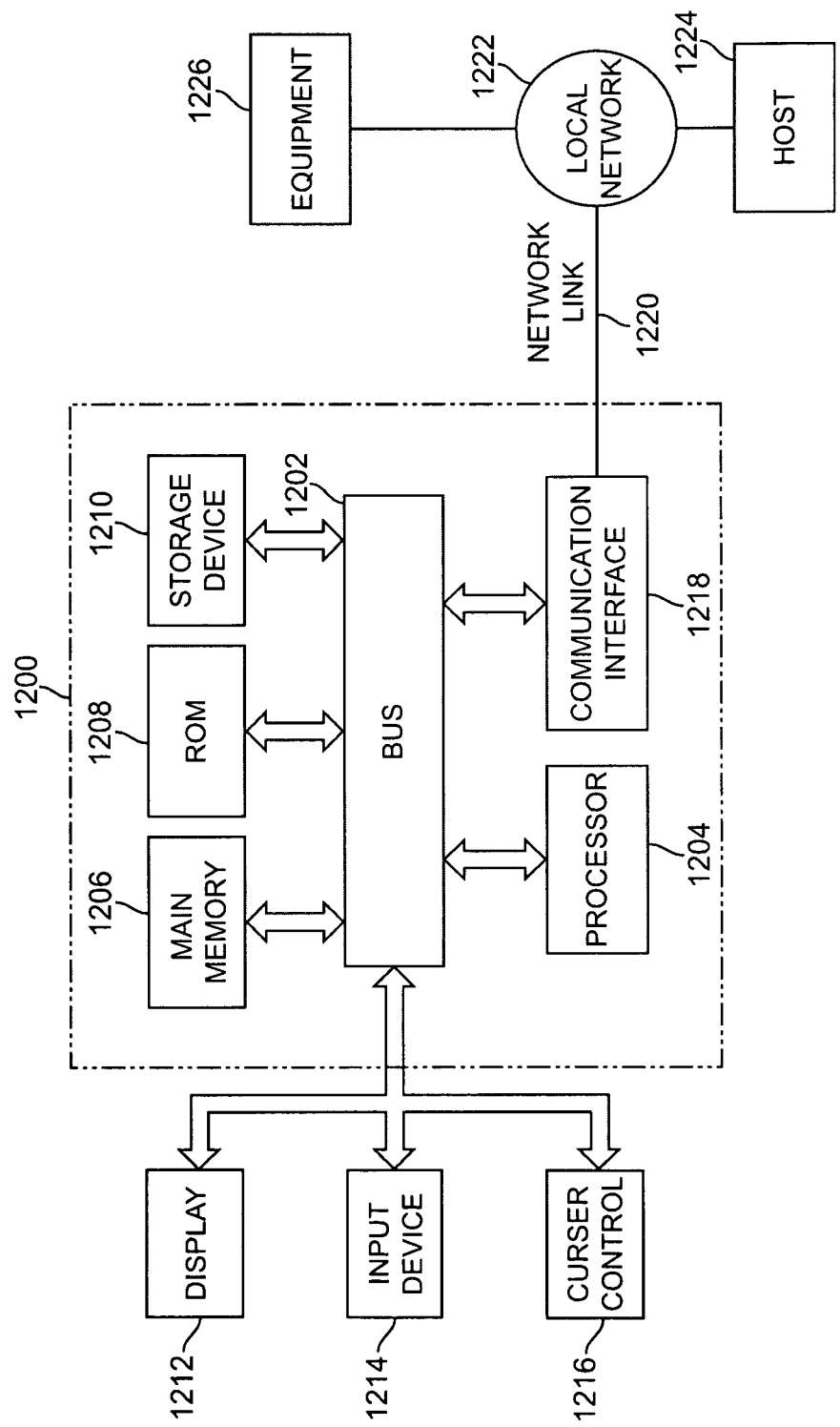
FIG. 7 is a block diagram of a computer system architecture, with which embodiments described herein may be implemented

FIG. 7 is a block diagram that illustrates an embodiment of a computer system 1200 upon which an embodiment of the invention may be implemented. Computer system 1200 includes a bus 1202 or other communication mechanism for communicating information, and a processor 1204 coupled with the bus 1202 for processing information. The processor 1204 may be an example, or a component, of the processor 54 of FIG. 1. In some cases, the computer system 1200 may be used to implement the processor 54. The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a flat panel, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for processing image data in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. Volatile media includes dynamic memory, such as the main memory 1206. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. For example, the operations performed by the processor 54 can be performed by any combination of hardware and software within the scope of the invention, and should not be limited to particular embodiments comprising a particular definition of "processor." In addition, the term "image" as used in this specification includes image data that may be stored in a circuitry or a computer-readable medium, and should not be limited to image data that is displayed visually. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A system for obtaining an image, comprising:
a processor for
receiving a projection image, wherein the projection image is generated using a flat panel and a radiation source that is configured to provide a radiation beam,
processing the projection image to obtain a filtered image by applying filtering to one or more portions of the projection image having one or more attenuation values that exceed a prescribed threshold,
applying a first factor for the projection image to obtain a first weighted image,
applying a second factor for the filtered image to obtain a second weighted image, and
obtaining a corrected image using the first and second weighted images; and
a medium for storing the corrected image;
wherein the processor is configured to determine the prescribed threshold based at least in part on one or more of maximal attenuation values of previously acquired projection images, and wherein one of the previously acquired projection images comprises attenuation values that exceed the prescribed threshold.

2. The system of claim 1, wherein the processor is configured to obtain the corrected image based on a relationship:
$P_{corr}(x,y)=Factor_1(x,y)*P_{raw}(x,y)+Factor_2(x,y)*P_{filtered}(x,y)$ equation, wherein $P_{corr}(x,y)$ represents the corrected image, $P_{raw}(x,y)$ represents the projection image, $P_{filtered}(x,y)$ represents the filtered image, $Factor_1(x,y)$ represents the first factor, and $Factor_2(x,y)$ represents the second factor.

3. The system of claim 1, wherein the first factor comprises a weighting function that determines a strength of a filter to be applied for each pixel in the projection image.

4. The system of claim 1, wherein the projection image comprises a subset of an image frame.

5. The system of claim 1, further comprising a computed tomography system including the flat panel for generating the projection image.

6. The system of claim 5, wherein the computed tomography system is configured to provide a cone-beam.

7. The system of claim 1, wherein the processor is configured to obtain the corrected image by adding the first and second weighted images.

8. The system of claim 1, wherein the first factor is equal to 1 minus the second factor, or equal to 1 minus a sum of factors that include the second factor.

9. The system of claim 1, further comprising the flat panel for generating the projection image.

10. The system of claim 1, wherein the second factor is a function of a geometry of an object.

11. The system of claim 10, wherein the geometry of the object is determined using attenuation values.

12. The system of claim 1, wherein the second factor is a function of a number of projection images that have been obtained.

13. The system of claim 1, wherein the processor is configured to receive a plurality of projection images that includes the projection image, and to keep track of maximal attenuation values for the respective projection images, the projection images generated at different gantry angles.

14. The system of claim 1, wherein the processor is configured to control the radiation source based on the second factor.

15. The system of claim 1, wherein the processor is configured to use the corrected image to reconstruct a three-dimensional image.

16. The system of claim 1, wherein the first factor is equal to 1, and the processor is configured to apply the first factor for the projection image to obtain the first weighted image by using the projection image as the first weighted image.

17. A method of processing an image, comprising:
receiving a projection image, wherein the projection image is generated using a flat panel and a radiation source that is configured to provide a radiation beam;
processing the projection image to obtain a filtered image by applying filtering to one or more portions of the projection image having one or more attenuation values that exceed a prescribed threshold;
determining a corrected image by applying a first factor for the projection image, and applying a second factor for the filtered image; and
determining the prescribed threshold based at least in part on one or more of maximal attenuation values of previously acquired projection images, wherein one of the previously acquired projection images comprises attenuation values that exceed the prescribed threshold.

18. The method of claim 17, wherein the corrected image is determined based on a relationship: $P_{corr}(x,y) = Factor_1(x,y)*P_{raw}(x,y) + Factor_2(x,y)*P_{filtered}(x,y)$, wherein $P_{corr}(x,y)$ represents the corrected image, $P_{raw}(x,y)$ represents the projection image, $P_{filtered}(x,y)$ represents the filtered image, $Factor_1(x,y)$ represents the first factor, and $Factor_2(x,y)$ represents the second factor.

19. The method of claim 17, wherein the projection image comprises a subset of an image frame.

20. The method of claim 17, wherein the first factor is applied for the projection image to obtain a first weighted image, the second factor is applied for the filtered image to obtain a second weighted image, and wherein the corrected image is determined by adding the first and the second weighted images.

21. The method of claim 17, further comprising generating the projection image using a computed tomography technique.

22. The method of claim 17, further comprising generating the projection image using a cone-beam.

23. The method of claim 17, wherein the first factor is equal to 1 minus the second factor, or equal to 1 minus a sum of factors that include the second factor.

24. The method of claim 17, further comprising generating image signals using the flat panel, wherein the projection image is received by reading the image signals from the flat panel.

25. The method of claim 17, wherein the second factor is a function of a geometry of an object.

26. The method of claim 25, wherein the geometry of the object is determined using attenuation values.

27. The method of claim 17, wherein the second factor is a function of a number of projection images that have been obtained.

28. The method of claim 17, further comprising receiving a plurality of projection images that includes the projection image, and keeping track of maximal attenuation values for the respective projection images, the projection images generated at different gantry angles.

29. The method of claim 17, further comprising controlling the radiation source based on the second factor.

30. The method of claim 17, further comprising using the corrected image to reconstruct a three-dimensional image.

31. The method of claim 17, wherein the first factor is equal to 1, and the act of applying the first factor for the projection image is accomplished by using the projection image itself as a factored image.

32. The system of claim 1, wherein the processor is configured for applying the first factor for the projection image to obtain the first weighted image before an image reconstruction is performed.

33. the method of claim 17, wherein the first factor is applied for the projection image before an image reconstruction is performed.

* * * * *